US008878859B1

(12) United States Patent
van Scherrenburg

(10) Patent No.: US 8,878,859 B1
(45) Date of Patent: Nov. 4, 2014

(54) AUTOMATIC VGA MONITOR DETECTION

(75) Inventor: Micheal Anthonius van Scherrenburg, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 551 days.

(21) Appl. No.: 13/220,380

(22) Filed: Aug. 29, 2011

(51) Int. Cl.
*G06F 13/14* (2006.01)

(52) U.S. Cl.
USPC .......... 345/520

(58) Field of Classification Search
CPC . G06F 1/266; G09G 2320/08; G09G 2356/00
USPC .......... 345/520
See application file for complete search history.

(56) References Cited

U.S. PATENT DOCUMENTS

| | | | | |
|---|---|---|---|---|
| 6,346,927 | B1 * | 2/2002 | Tran et al. | 345/1.1 |
| 7,477,247 | B2 * | 1/2009 | Yee | 345/213 |
| 2009/0210591 | A1 * | 8/2009 | Tsai | 710/69 |

* cited by examiner

*Primary Examiner* — Hau Nguyen
(74) *Attorney, Agent, or Firm* — North Weber & Baugh LLP

(57) ABSTRACT

Various embodiments of the present invention relate to methods, systems and devices of employing a monitor detection module in a computer to automatically detect the presence of a VGA display. Such a system for automatic VGA monitor detection comprises a central processing unit (CPU), a GPU, a VGA connector and the monitor detection module. The CPU provides image information to the GPU which further processed the image information to generate video signals according to a VGA display standard. The video signal comprises analog video signals (i.e., red, green and blue) and synchronization signals (i.e., horizontal and vertical). The video signals are transmitted to the VGA connector at the interface of the computer. A VGA monitor or projector may be connected to the computer at the VGA connector via a VGA data cable. The monitor detection module receives at least one of the analog video signals and at least one of the sync signals, identifies a monitor detection pulse synchronous with the sync signal, and monitors the impedance at the pin for the analog video signal at the VGA connector during the monitor detection pulse. The monitor detection module takes advantage of synchronization pulses in the horizontal or vertical sync signal to monitor termination resistance of an analog video signal line, and thus, the VGA display may be detected reliably at a fast rate without interfering with video signal transmission.

20 Claims, 7 Drawing Sheets

200

250

AUTOMATIC VGA MONITOR DETECTION

BACKGROUND

A. Technical Field

The present invention relates generally to integrated circuits, and more particularly to methods, systems and devices of employing a monitor detection module in a computer or computer system to detect the presence of a VGA display. The monitor detection module takes advantage of synchronization pulses in a horizontal or vertical sync signal to monitor termination resistance of an analog video signal line, and thus, the VGA monitor may be detected reliably at a fast rate while not interfering with video signal transmission.

B. Background of the Invention

Video Graphic Array (VGA) refers to the display hardware first introduced by IBM in 1987, and thereafter, has been widely adopted as an analog display standard by personal computers, e.g., desktop, laptop and tablet computers. A VGA monitor or projector may be employed not only as a primary display device but also as a secondary display device in these personal computers.

In today's computer systems, a software operating system (OS), e.g., Microsoft Windows®, detects and identifies each VGA monitor or projector that is connected, and applies the video settings that are best suited to the display. The software OS collects the display's video capabilities, including screen size, resolution and color depth, and allows a user to choose the video settings when a particular VGA monitor or projector is connected for the first time. These video capabilities and settings are stored in the computer systems, and automatically loaded to configure graphics hardware, e.g., a graphics processing unit (GPU), at the computer-display interface for reconnection of this VGA monitor or projector.

Display data channels (DDC) are formed according to communication protocols between a graphics hardware in the computer system and the VGA monitor. DDC1 and DDC2 are two commonly-used data protocols for integrating digital interfaces in the computer and for enabling communication between the computer and the VGA monitor. DDC1 allows the VGA monitor to send the computer its video settings, and DDC2 allows a bidirectional communication via which the computer not only receives the video settings of the VGA monitor but also controls the video settings. In particular, the signals in DDC2 are consistent with the standard inter-integrated circuit (12C) interface. The software operating systems receive the video settings and/or generate commands to adjust the video settings according to the DDC data protocols.

Despite of acceptable performance in most cases, software-dependent monitor control is plagued with reliability issues. Software needs to issue commands to read or adjust the video settings, and commands are issued via serial data at a relatively low rate. In many occasions, the computer may not detect the VGA monitor right upon connection, and sometimes, may even fail to detect the connection. The software operating system normally has to reserve an option for the users to initialize a manual search for the VGA display. Sometimes, the software operating system checks the monitor load at such a low rate (e.g., once every few minutes) that the computer may not even be aware that a first monitor is disconnected and a second monitor is connected. The video settings of the first monitor may be erroneously adopted by the computer to drive the second monitor. Moreover, the software operating system often fails to detect that a VGA monitor is powered off although it is still connected to the graphics hardware of the computer.

Software-dependent monitor control is also plagued with energy and cost efficiency problems that are associated with some of the aforementioned reliability issues. In particular, when the software operating system neglects the VGA monitor that is powered off, the graphics hardware remains functioning as if the VGA monitor is actively loaded. As a result, the graphics hardware consumes redundant power, which is not desirable as energy requirements get stringent for future products. Moreover, additional filtering components are needed for the graphics hardware in order to reduce noise introduced by an inactive load of the VGA monitor. Cost efficiency is largely degraded due to material and assembly cost. As a result, it is desirable to detect the presence or absence of the VGA monitors reliably at a fast rate, and, more importantly, to detect an inactive connection of the VGA monitor while it is powered off.

SUMMARY OF THE INVENTION

Various embodiments of the present invention relate to integrated circuits, and more particularly to methods, systems and devices of employing a monitor detection module at an input/output interface of a computer to detect the presence of a VGA display. The monitor detection module takes advantage of horizontal or vertical synchronization pulses to monitor termination resistance of a video signal line, and thus, the VGA display may be detected reliably at a fast rate without interfering with video signal transmission.

A computer for automatic VGA monitor detection comprises a central processing unit (CPU), a graphics processing unit (GPU), a VGA connector and the monitor detection module. The CPU provides image information to the GPU which further processed the image information to generate video signals according to a VGA display standard. The video signal comprises analog video signals (i.e., red, green and blue) and synchronization signals (i.e., horizontal and vertical). The video signals are transmitted to the VGA connector at the interface of the computer. A VGA monitor or projector may be connected to the computer at the VGA connector via a VGA data cable. The monitor detection module receives at least one of the analog video signals and at least one of the sync signals, identifies a monitor detection pulse within the sync signal, and monitors the voltage at the pin for the analog video signal at the VGA connector during the monitor detection pulse.

For automatic monitor detection, a monitor detection module in a computer comprises a monitoring control circuit, a first switch, a test pull-up resistor or a current source, a second switch, and a signal processing module. The monitoring control circuit receives a sync signal from a GPU in the computer and identifies a monitor detection pulse according to synchronization pulses in the sync signal. The test pull-up resistor or current source is connected with a pin for an analog video signal that is included in a VGA connector at the interface of a computer. During the monitor detection pulse, the first and second switches are controlled to couple the test pull-up resistor or current source to the power supply and disconnect the GPU from the pin for the analog video signal during the monitor detection pulse. At the presence of an active VGA display, the impedance at the pin for the analog video signal is coupled in series with the test pull-up resistor or the current source, and the voltage at the pin reset to a known and stable voltage; otherwise, the pin is pulled up to a power supply. As a result, the voltage at the pin may be processed by the signal processing module to generate at least one control signal that may be used by the GPU and a CPU in the computer.

A method of automatically detecting a VGA display in a computer comprises the steps of identifying a monitor detection pulse, coupling a test pull-up resistor or current source to a power supply, disconnecting the GPU from a pin for an analog video signal at a VGA connector, and processing the output at the pin for the analog video signal to generate at least one control signal for a GPU and a central processing unit (CPU) in the computer.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

In various embodiments of the present invention, an automatic VGA monitor detection method is implemented using a dedicated hardware, i.e., a monitor detection module, rather than a software operating system in a computer. The monitor detection module is incorporated in the computer to detect the presence of a VGA display, e.g., a monitor or projector. The monitor detection module takes advantage of horizontal or vertical synchronization (sync) pulses existing in a standard VGA connector interface, and monitors termination resistance of a video signal line during the sync pulses. As a result, the VGA monitor may be detected reliably at a fast rate while not interfering with video signal transmission. Moreover, as the VGA display is absent or powered off, the GPU may be disabled to reduce power consumption of the computer system.

Figure 1:
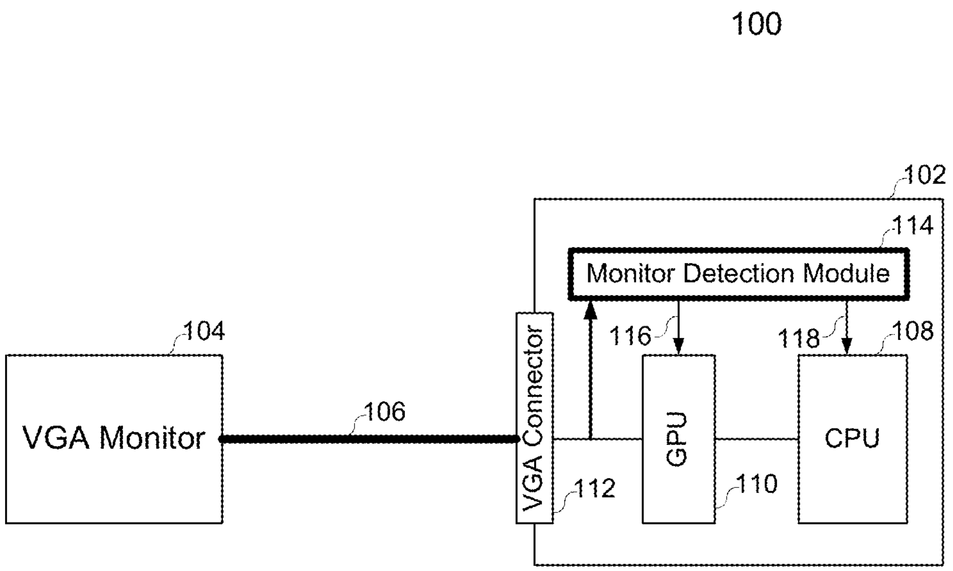
FIG. 1 illustrates an exemplary block diagram of a computer system based on automatic VGA monitor detection according to various embodiments of the invention.

FIG. 1 illustrates an exemplary block diagram 100 of a computer system based on automatic VGA monitor detection according to various embodiments of the invention. The computer system 100 comprises a computer 102 that is connected to a VGA monitor 104 via a VGA data cable 106. The VGA monitor 104 may be a monitor or a projector that is compatible to receive analog video signals according to a VGA monitor standard. The computer 102 monitors the presence of the VGA monitor 104. In addition, the computer 102 also detects that the display 104 is absent or is present while not being actively powered. To achieve these objectives, the computer 102 comprises a central processing unit (CPU) 108, a graphics processing unit (GPU) 110, a VGA connector 112, and a monitor detection module 114.

The CPU 108 is a primary element that carries out main functions of the computer 102. The CPU 108 implements instructions according to computer programs and data that are provided by a software operating system. Therefore, the operating system controls the CPU 108 to manage various hardware resources including memory, keyboard, printer, and CD/DVD driver; and execute application programs in the computer 102. The GPU 110 is one of the hardware resources managed by the CPU 108 and its software operating system, and mainly used to drive display devices in the computer system 100. In particular, the CPU 108 may provide the GPU 110 with image information for display on the VGA monitor 104. Both the CPU 108 and the GPU 110 are mounted on a motherboard in the computer 100.

The GPU 110 may be a circuit module integrated on another integrated circuit on a motherboard, or a dedicated graphics card that is normally referred to as video card, video adapter, graphics accelerator card, display adapter, or graphics adapter. The GPU 110 may be coupled between the CPU 108 and the VGA monitor 104. The CPU 108 issues commands to detect the VGA monitor 104 and obtain its video settings. The video settings of a VGA monitor include screen size, resolution, brightness, contrast, and refresh rate. According to these video settings, the GPU 110 processes image information from the CPU 108 to generate video signals for display on the VGA monitor 108. These video signals are compatible with the VGA display standard.

In various embodiments of the present invention, the GPU 110 may incorporate additional image processing functions to image information formatting. The GPU 110 may render three-dimensional (3D) scenes from two-dimensional (2D) image/video information, capture video frames, be adapted to television (TV), decode MPEG-2/MPEG-4 video signals, and connect to support multiple monitors. In particular, some high performance GPUs are used for more graphically demanding purposes, such as PC games.

In a preferred embodiment, the GPU 110 is associated with a hibernation state in addition to an active state. In the active state, the GPU 110 is actively powered to implement its functions of obtaining video settings of the VGA monitor 108 and processing the image information from the CPU 108. In the hibernation state, the GPU 110 may be set to a low power mode in which some function modules in the GPU 110 are disabled or the GPU 110 is disconnected from power supplies. The GPU 110 may reset to the hibernation state by the first control signal 116, as the VGA monitor 104 is powered off or disconnected to reduce power consumption.

Figure 2A:
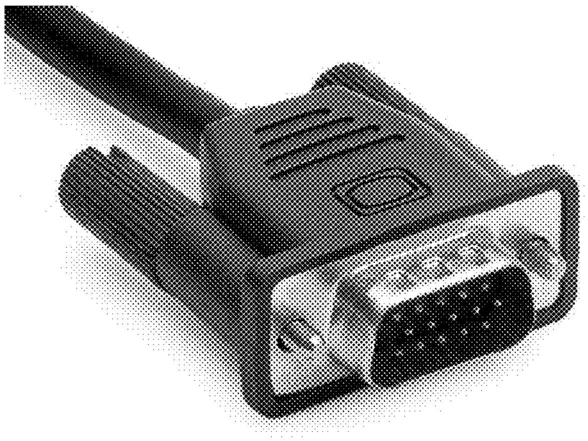
FIG. 2A illustrates an exemplary image shot of a VGA connector according to various embodiments of the present invention.
Figure 2B:
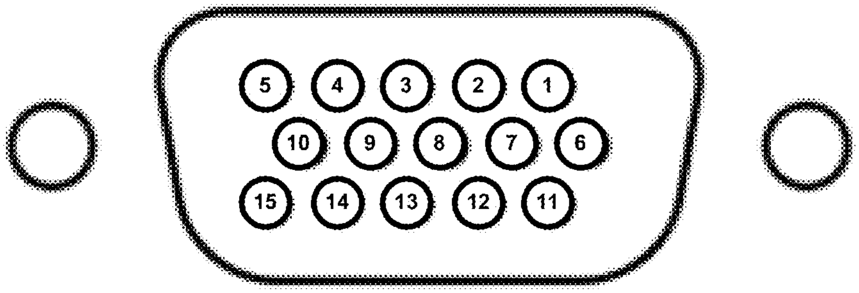
FIG. 2B illustrates an exemplary pin diagram of a VGA connector according to various embodiments of the present invention.

The GPU 110 in the computer 102 is coupled to the VGA monitor 104 via the VGA connector 112 and the VGA data cable 106. FIG. 2A illustrates an exemplary image shot 200 of a VGA connector according to various embodiments of the present invention. The VGA connector 200 is fixed at the end of the VGA data cable 106, and matches the VGA connector 112 at the interface of the computer 102. FIG. 2B illustrates an exemplary pin diagram of the VGA connector 112 according to various embodiments of the present invention. The VGA connector 112 contains 15 pins arranged in three rows; and Pins 1-5, 6-10 and 11-15 are located from right to left in those three rows, respectively.

In accordance with the VGA display standard, the VGA connector 112 and the VGA data cable 106 contains 15 signal pins and wires. The VGA data cable 106 may be capable of delivering VGA video signals at various resolutions (e.g., 600×400, 1280×1024) and at a display refresh rate ranging from 60 Hz to 100 Hz. Coaxial cables with high quality shielding are needed to reduce signal crosstalk. Moreover, the impedance of the VGA data cables 106 is around 75 ohm, and proper cable termination and splitter is necessary at both ends of the cables 106 to avoid video signal reflection and degradation of image quality.

The VGA connector 112 and the VGA data cable 106 allows data exchange for video settings requested by the CPU 108, and carries analog video signals from the GPU 110 to the VGA monitor 104. Table 1 lists an exemplary list of pins for analog video signal transfer according to the VGA display standard using the VGA connector 112 and data cable 106. Historically, the VGA connector 112 and data cable 106 evolves from its original version to a display data channel (DDC) version advanced by the Video Electronics Standards Association (VESA).

Both the original and VESA DDC versions include analog video signals for red, green and blue colors; synchronization (sync) signals for horizontal and vertical synchronization; and their respective return/ground paths. To facilitate video setting check, rarely used monitor ID bits and key in the original version are reconfigured as data channels (i.e., VESA DDC) and power supply, respectively, to allow serial data transfer for exchanging commands and video settings between the computer 102 and the VGA monitor 104. In a software based monitor detection approach, the CPU 108 relies on these VESA DDCs to detect the VGA monitor 104.

TABLE 1

List of Pins for analog video signal transfer using a VGA connector and data cable

| | Original Version | | VESA DDC | |
|---|---|---|---|---|
| Pin Number | Pin Name | Function | Pin Name | Function |
| 1 | Red | Analog video signal for red color | | |
| 2 | Green | Analog video signal for green color | | |
| 3 | Blue | Analog video signal for blue color | | |
| 6 | RED_RTN | Return paths for red, green | | |
| 7 | GREEN_RTN | and blue analog video | | |
| 8 | BLUE_RTN | signals | | |
| 13 | HSync | Horizontal synchronization signal | | |
| 14 | VSync | Vertical synchronization signal | | |
| 5 | GND | Ground for HSync | | |
| 10 | GND | Ground for VSync | | |
| 4 | ID2 | Monitor ID bits | RES | E-DDC |
| 11 | ID0 | | RES | E-DDC |
| 12 | ID1 | | SDC | I2C data |
| 15 | ID3 | | SCL | I2C clock |
| 9 | KEY | Key | PWR | +5V DC power |

In various embodiments of the present invention, the computer 102 further comprises a hardware unit, i.e., the monitor detection module 114, dedicated to automatic VGA monitor detection. The monitor detection module 114 is coupled to the VGA connector 112, and identifies monitor detection pulses synchronous with sync pulses in at least one of the sync signals. In one embodiment, the monitor detection module 114 generates two control signals 116 and 118 within the monitor detection pulses, and these two control signals 116 and 118 indicate the condition of the VGA monitor 104. The first control signal 116 is used to control the GPU 110. The second control signal 118 is optionally used by the CPU 102. Therefore, the CPU 102 may be acknowledged of the condition of the VGA monitor 104 directly by the second control signal 118 or indirectly by the GPU 110.

The monitor detection module 114 is coupled to receive at least one of the analog video signals (red, green or blue) and at least one of the sync signals (horizontal or vertical) from the VGA connector 112. The impedance at the pin for the analog video signal is regularly monitored during sync pulses in the sync signal. In various embodiments of the present invention, the impedance at a pin for an analog video signal refers to the termination resistance overseen toward the VGA monitor 104 from the pin at the VGA connector 112, and thus depends on the impedance of the cable and the presence of the VGA monitor 104.

Once the VGA monitor 104 is loaded and powered on, the impedance at any of three analog video signal pins is around 75 ohm. Cables from different manufacturers may have slightly varying impedances that are within a tolerant range R of the nominal impedance (i.e., 75 ohm). In certain embodiments, the range R may be from 60 ohm to 85 ohm. However, when the VGA monitor 104 is powered off or disconnected, the impedance at any of three analog video signal pins deviates from 75 ohm and falls out of the range R, and the voltages at these pins change. Therefore, the monitor detection module 114 compares the voltage at the pin for the analog video signal to at least one reference voltage to determine whether the impedance falls within the range R and thus to determine whether the VGA monitor 104 is connected and powered on.

Figure 3:
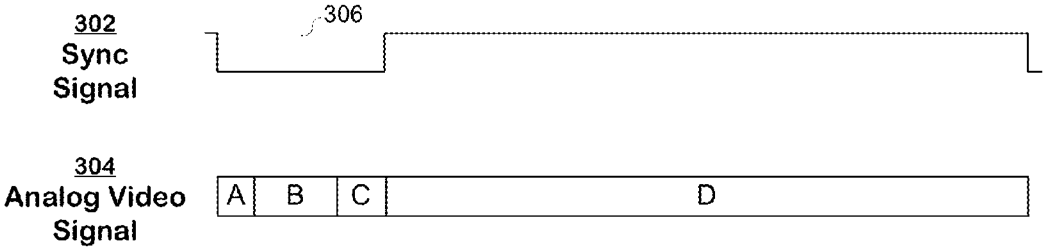
FIG. 3 illustrates an exemplary sync signal and an exemplary analog video signal according to various embodiments of the present invention.

FIG. 3 illustrates an exemplary sync signal 302 and an exemplary analog video signal 304 according to various embodiments of the present invention. Both signals are generated by the GPU 110 for display on the VGA monitor 104. The sync signal 302 is selected from the horizontal sync signal at pin 13 and the vertical sync signal at pin 14 of the VGA connector 112. Both sync signals are synchronous with the analog video signals carrying video signal streams. The horizontal sync signal includes a sync pulse 306 indicating the start of an incoming video signal stream for each row of image pixels, while a similar sync pulse 306 included in the vertical sync signal indicates the start for a frame of image pixels. As a result, the frequencies and pulse widths of the sync pulses are different for the horizontal and vertical sync signals. In one embodiment, when a VGA monitor has a resolution of 1440×900 and a refresh rate of 60 Hz, the horizontal and vertical sync signals are associated with sync pulses having widths of 1.8 μsec and 468 μsec at frequencies of 55.5 kHz and 60 Hz, respectively.

The analog video signal 304 is selected from red, green and blue video signals at pins 1, 2 and 3 in reference to the return signals at pins 6, 7 and 8, respectively. In the analog video signal 304, the video signal stream for images pixels is time-multiplexed according to video frames and rows. For each video frame, the analog video signal 304 is synchronous to the sync pulse 306 in the vertical sync signal. For each row in the video frame, the signal 304 is synchronous to the sync pulse 306 in the horizontal sync signal.

Regardless of the horizontal or vertical sync signal, the sync pulse is associated with three porches (A, B and C) in the analog video signal 304. Porches A, B and C are respectively used to allow the signal 304 to stabilize, synchronize with the sync signal, and reset to a black level for the subsequent video signal stream transmitted in porch D. In order to detect the VGA monitor 104, a monitor detection pulse is identified to synchronize with the sync pulse 306, and particularly, during a porch selected from porches A, B and C. The impedance at the pin of the analog video signal 304 is monitored during the monitor detection pulse. In a preferred embodiment, the impedance may be monitored during porch B, reducing the impact to the video signal stream in porch D.

One of those skilled in the art knows that automatic monitor detection may be completed within a time duration that is shorter than the lengths of porches A, B and C. During the time duration, the analog video signals from the GPU 110 may be temporarily disconnected from the VGA connector 112. As a result, a small pulse width is preferred, such that video signal synchronization is not compromised during porches A, B or C to degrade high quality display during porch D.

In one embodiment, automatic monitor detection is implemented once during every sync pulse 306, and therefore, the horizontal and vertical sync signals are associated with two distinct detection frequencies and rates. In one embodiment, when a VGA monitor has a resolution of 1440×900 and a refresh rate of 60 Hz, the horizontal sync signal is associated with an approximate detection rate of 18 μsec, much better than the rate of 16,600 μsec based on the vertical sync signal. Although the horizontal sync signal results in a much faster detection rate, the monitor detection module 114 is coupled to receive the vertical sync pulse in a preferred embodiment such that the VGA monitor 104 may be detected with a lower power.

The impedance at the pin of the analog video signal 304 is monitored during monitor detection pulses that are synchronous with the sync pulse 306. Since no active video signal stream is involved in the sync pulse 306 (or porches A, B and C), such an automatic monitor detection method does not interfere with video signal transmission in porch D, and thus, image quality is not impacted.

Figure 4A:
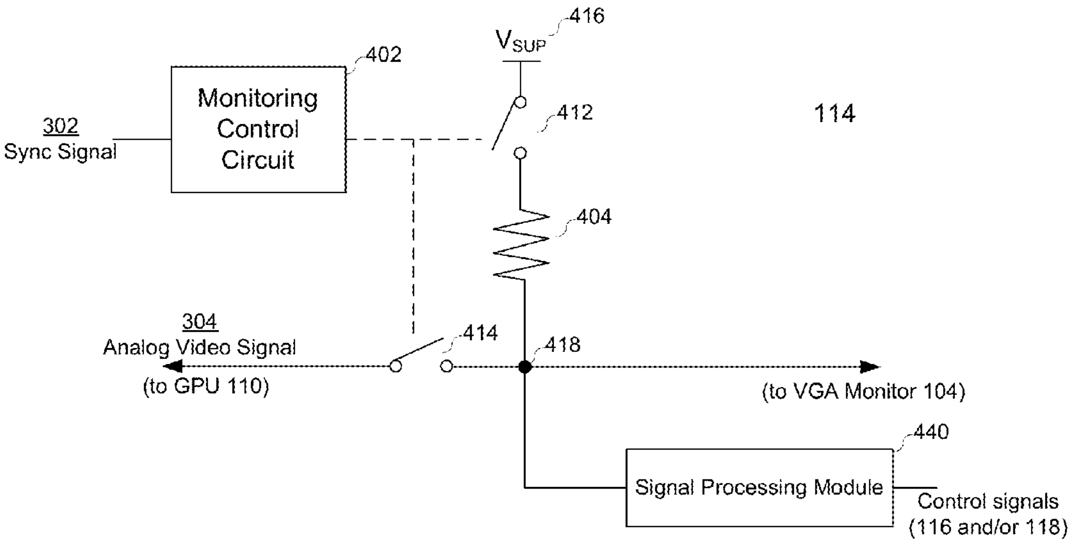
FIG. 4A illustrates an exemplary block diagram of a monitor detection module according to various embodiments of the present invention.

FIG. 4A illustrates an exemplary block diagram of a monitor detection module 114 according to various embodiments of the present invention. The monitor detection module 114 is coupled to receive the sync signal 302 and the analog video signal 304 from the GPU 110, and generates two control signals 116 and 118 indicating whether a VGA monitor 104 is loaded and powered on. This monitor detection module 114 comprises a monitoring control circuit 402, a test pull-up resistor 404, two switches 412 and 414, and a signal processing module 440.

The monitoring control circuit 402 is coupled to receive the sync signal 302, and generates an enable signal to control the switches 412 and 414 and monitor the voltage at an pin 418 for the analog video signal 304. The enable signal includes monitor detection pulses within which presence of the VGA monitor 104 may be checked by the module 114. In certain embodiments, the GPU 110 is in an active state, and provides both analog video signals and sync signals. The monitoring control circuit 402 identifies the sync pulse 306 in a horizontal or vertical sync signal, and generates the monitor detection pulses in the enable signal according to the sync pulse 306. In another embodiment, since the VGA monitor 104 is not connected or connected but not powered on, the GPU 110 is set in a hibernation state to reduce energy consumption. The GPU 110 does not provide the sync signals. Voltage levels of the horizontal and vertical sync signals remain constant and involve no sync pulses. The monitoring control circuit 402 monitors the voltage levels, and periodically generates the monitor detection pulses for enabling VGA monitor detection as the GPU 110 is in a hibernation state.

Figure 4B:
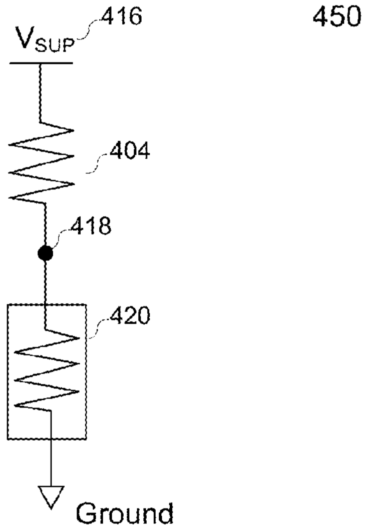
FIG. 4B illustrates a resistor divider formed as a VGA monitor is present according to various embodiments of the present invention.

During each monitor detection pulse, the switch 412 is turned on while the switch 414 is turned off. The test pull-up resistor 404 is connected to a power supply 416, and the analog video signal from the GPU 110 is temporarily disconnected from the pin 418 for the analog video signal. Therefore, when an active VGA monitor 104 is present, the test pull-up resistor 404 and the VGA monitor 104 forms a resistor divider. FIG. 4B illustrates the resistor divider 450 as the VGA monitor 104 is present according to various embodiments of the present invention.

However, when an inactive VGA monitor 104 (i.e., connected by not powered) or no VGA monitor is present, the VGA connector 112 is equivalently loaded with an open circuit, and the pin 418 for the analog video signal 304 is pulled up to the power supply 416 by the test pull-up resistor 404. In various embodiments of the present invention, an inactive VGA monitor 104 may be associated with a VGA monitor that is connected while not being powered, and when no VGA monitor is present, the VGA data cable 106 may be connected or removed. As a result, the VGA connector pin 418 for the analog video signal may be monitored to indicate both active or inactive presence and absence of the VGA monitor 104.

In certain embodiments, a current source is applied in the place of the test pull-up resistor 404, and the load resistance of this current source varies with existence of the VGA monitor. As no VGA monitor is loaded, the load resistance is infinitively large, and the output at the pin 418 is close to the supply voltage $V_{SUP}$. As a standard VGA monitor is loaded, the load resistance drops to about 75 ohm, and the output at the pin reaches a known and stable Voltage.

Both the test pull-up resistor and the current source is a bias element coupled to the impedance at the pin for the analog video signal. The bias element and the impedance are coupled in series between the power supply and the ground when the VGA monitor is loaded.

Figure 4C:
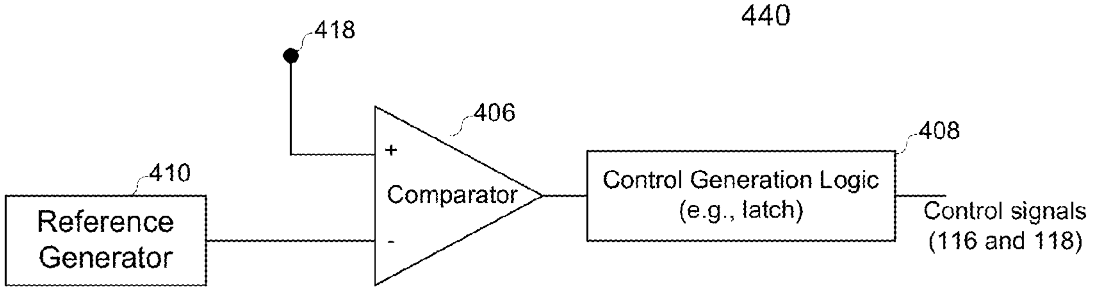
FIG. 4C illustrates an exemplary block diagram of a signal processing module according to various embodiments of the present invention.

FIG. 4C illustrates an exemplary block diagram of a signal processing module 440 according to various embodiments of the present invention. The comparator 406 compares the voltage at the pin 418 for the analog video signal to at least one reference voltage provided by the reference generator 410. The comparison result is latched or further processed by the control generation logic 408, and outputted as control signals 116 and 118 which may be further used to control the GPU 110 and the CPU 108.

In one embodiment, a test pull-up resistor 404 is used to extract the output at the pin 418, and the voltage is determined by the presence of the VGA monitor 104 and the resistance of the test pull-up resistor 404. When the VGA monitor 104 is inactive or absent, the voltage at the pin 418 saturates at the supply voltage $V_{SUP}$, and results in a logic low level for the control signals 116 and 118. When the VGA monitor 104 is present and powered on, the impedance $R_{MON}$ at the terminal for the analog video signal is in the range R (e.g., 60-85 ohm) around a nominal value of 75 ohm. The test pull-up resistor has a resistance of $R_{PULLUP}$. The voltage $V_{MON}$ at the pin 418 for the analog video signal may be presented by $$V_{SUP} \times R_{MON}/(R_{MON}+R_{PULLUP}).$$

Therefore, based on such a representation of $V_{MON}$, the reference generator 410 may be designed to generate a reference voltage $V_{REF}$ according to the resistance $R_{PULLUP}$ of the test pull-up resistor, such that the impedance $R_{MON}$ in the range R may result in a logic high level indicating the presence of an active VGA monitor 104 properly.

For instance, the resistance $R_{PULLUP}$ is selected as 2 Kohm, and the power supply 416 is 5V. The impedance $R_{MON}$ in the range R (e.g., 60-85 ohm) is associated with a voltage $V_{MON}$ between 0.15V and 0.20V. Thus, $V_{REF}$ may be generated at a voltage in a range of 1-4V, properly detecting the VGA monitor while allowing a margin of 0.8-1V for noise.

In another embodiment, a current source is applied in the place of the test pull-up resistor 404. The current source may generate a DC current $I_{DC}$. As a standard VGA monitor is loaded, the output at the pin reaches a known and stable voltage $V_{out}$ that is equal to $I_{DC} \times R_{MON}$. The reference voltage $V_{REF}$ is selected to be higher than this voltage, and the control signals are generated as a logic high that indicates existence of the VGA monitor. As no VGA monitor is loaded, the output at the pin 418 is close to the supply voltage $V_{SUP}$, higher than the reference voltage $V_{REF}$, and the control signals may be generated as a logic low that indicates non-existence of the VGA monitor.

Figure 5:
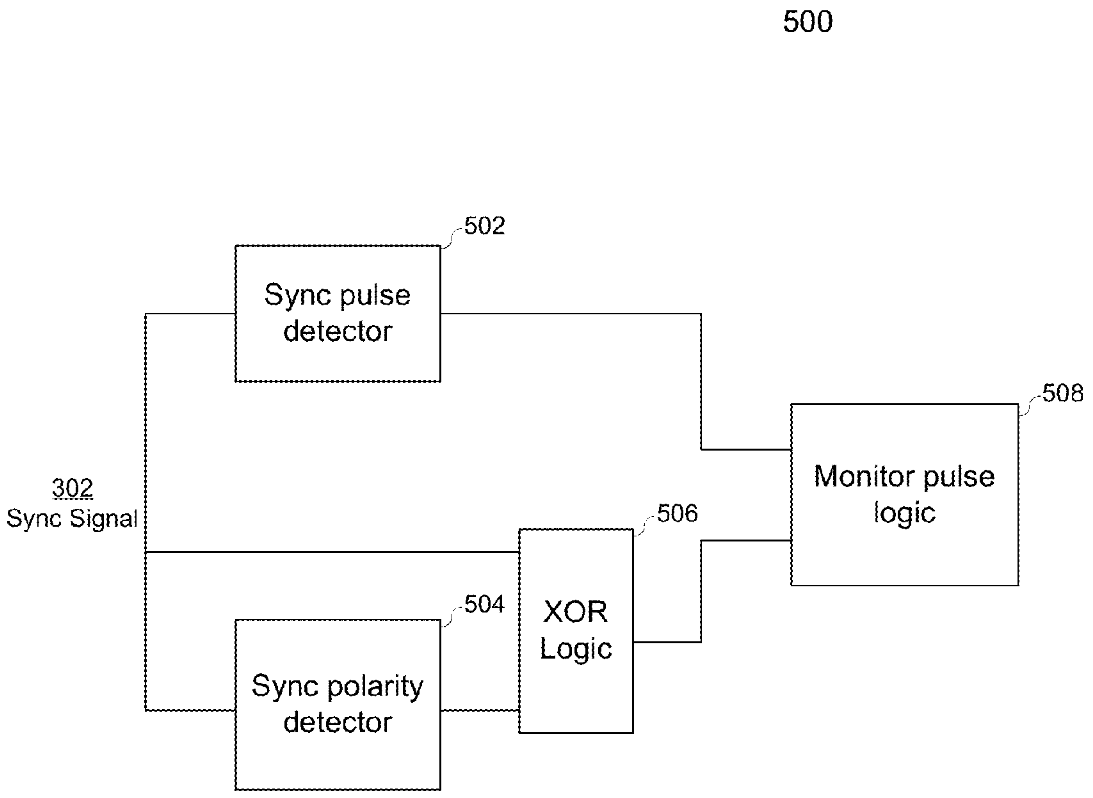
FIG. 5 illustrates an exemplary block diagram of a monitoring control circuit according to various embodiments of the present invention.

FIG. 5 illustrates an exemplary block diagram of a monitoring control circuit 402 according to various embodiments of the present invention. The monitoring control circuit 402 generates an enable signals including monitor detection pulses during which the VGA monitor is detected. The monitoring control circuit 402 not only identifies the monitor detection pulses according to the horizontal or vertical sync signals generates by the GPU 110, but also generates these monitor detection pulses as the VGA monitor 104 is first connected when the GPUs 110 is still disconnected from a power supply.

The monitoring control circuit 402 comprises a sync pulse detector 502, a sync polarity detector 504, a XOR gate 506 and a monitor pulse logic 508. The sync pulse detector 502 detects the sync pulse when the GPU 110 is in an active state. However, when the GPU 110 is in a hibernation state, the absence of a sync signal causes the sync pulse detector 502 to generate sync pulses autonomously. The sync polarity detector senses whether the sync signal 302 is positive or negative sync. The XOR gate 506 is coupled to both the sync signal 302 and the sync polarity detector 504 to provide a correct signal to the monitor pulse logic 508 regardless of the polarity of the sync signal 302. The logic 508 is coupled to both the sync pulse detector 502 and the XOR gate 506 to ensure proper generation of monitor detection pulses.

Figure 6:
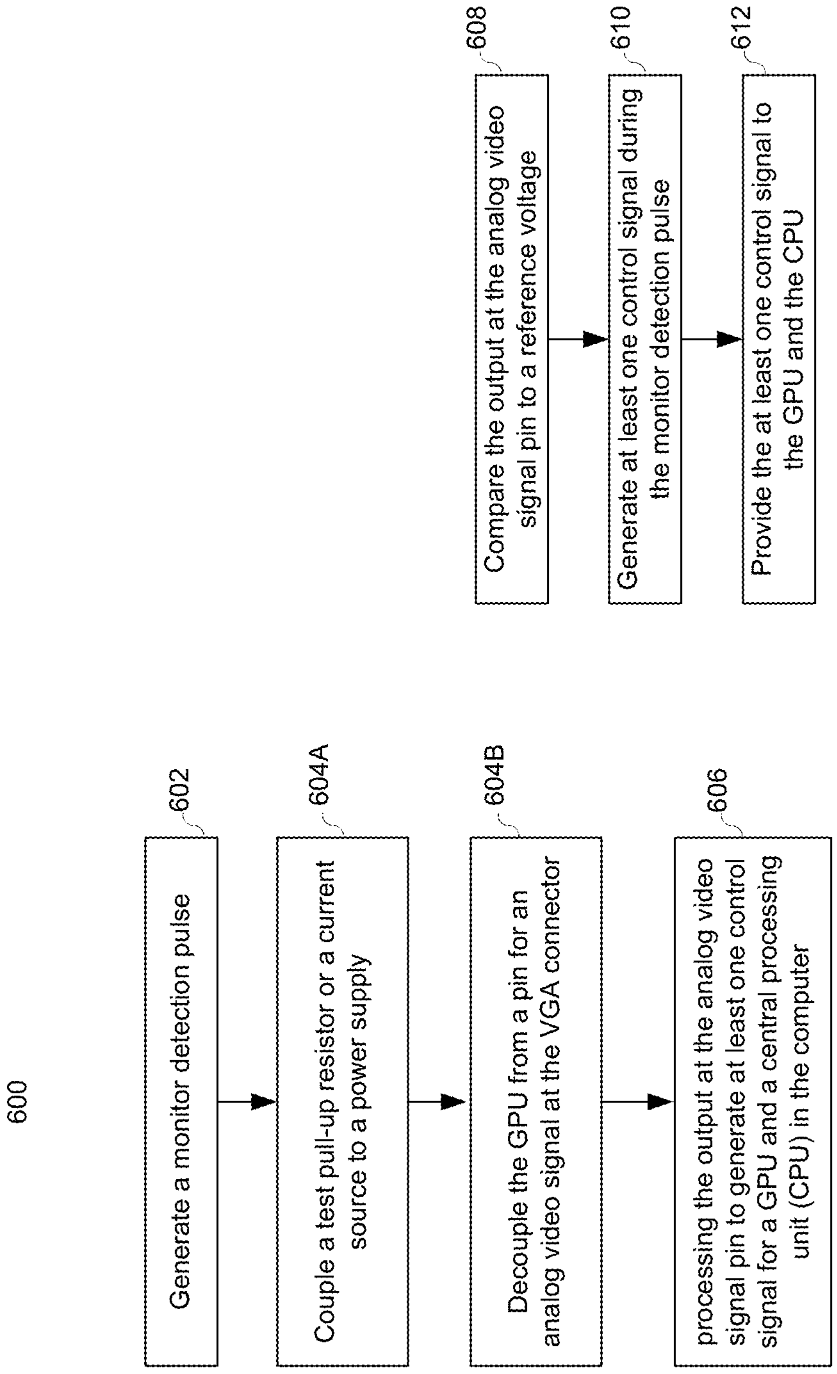
FIG. 6 illustrates an exemplary method of automatically detecting a VGA monitor according to various embodiments of the present invention.

FIG. 6 illustrates an exemplary method 600 of automatically detecting a VGA monitor according to various embodiments of the present invention. At step 602, a monitor detection pulse is identified or generated. If the GPU 110 is in an active state, the monitor detection pulse is synchronized with the sync pulse in the horizontal or vertical sync signal. Otherwise, when the GPU 110 is in a hibernation state, a periodic monitor detection pulse may be generated in an enable signal for automatic VGA monitor detection. In certain embodiments, when no sync signal is provided by the GPU 110, monitor detection may occur continuously till a VGA monitor is connected.

During the monitor detection pulse, a test pull-up resistor is coupled between a power supply ($V_{SUP}$) and a pin for the analog video signal at step 604A, and the GPU is decoupled from the pin for an analog video signal at step 604B. The pin for the analog video signal is included in the VGA connector. If the VGA monitor is present and powered on, a resistor divider is formed by the test pull-up resistor and the VGA monitor. The output from the resistor divider, i.e., the voltage at the pin, is determined by the resistance $R_{PULLUP}$ of the test pull-up resistor and the impedance $R_{MON}$ from the VGA monitor. Otherwise, the VGA monitor is present but not powered or absent, and the output from the resistor divider is pulled up to the power supply voltage ($V_{SUP}$).

In one embodiment, a current source may be coupled between a power supply ($V_{SUP}$) and a pin for the analog video signal to replace the test pull-up resistor at step 604A. If the VGA monitor is present and powered on, the voltage at the pin is determined by the current $I_{DC}$ of the current source and the impedance $R_{MON}$ from the VGA monitor. Otherwise, the VGA monitor is absent or present but not powered, and the output at this pin is pulled up to the power supply voltage ($V_{SUP}$) as well.

At step 606, the output at the pin for the analog video signal may be further used to generate at least one control signal for a GPU and a central processing unit (CPU) in the computer. In certain embodiment, step 606 may comprise three steps. At sub-step 608, the output from the pin for the analog video signal is compared with a reference voltage. In one embodiment based on a resistor divider, this reference voltage is determined by the resistance $R_{PULLUP}$ and the impedance $R_{MON}$. In another embodiment based on a current source, the reference voltage is determined by the current $I_{DC}$ and the impedance $R_{MON}$. A high logic level is outputted to indicate the presence of the VGA monitor, and a low logic level is outputted to indicate that the VGA monitor is connected without power or is absent. The logic level is latched or further processed to generate at least one control signal at sub-step 610.

The at least one control signal generated at sub-step 610 may be used to acknowledge the CPU 108 in the computer 102 of the condition of the VGA monitor at sub-step 612. The at least one control signal may also be directly used to control the GPU 110 in the computer 102. In particular, when no VGA monitor is connected or monitors are inactively connected without power, the GPU 110 may rely on this control signal to change to the hibernation state in which a low power mode is activated or the power supply is disconnected. Therefore, power consumption of the GPU 110 may be reduced to better meet stringent Energy Star criteria.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A monitor detection module for automatic monitor detection in a computer, comprising:

a monitoring control circuit coupled to a GPU in the computer, the monitoring control circuit receiving a sync signal from the GPU and generating an enable signal that comprises a monitor detection pulse based on synchronization pulses in the sync signal;

a bias element coupled to a pin that is associated with an analog video signal in a VGA connector, the bias element driving the pin for the analog video signal;

a plurality of switches coupled to the monitoring control circuit, the plurality of switches being controlled by the enable signal to couple the bias element to a power supply and decouple the GPU from the pin for the analog video signal during the monitor detection pulse; and a signal processing module coupled to the pin for the analog video signal, the signal processing module generating at least one control signal according to a voltage at the pin for the analog video signal.

2. The monitor detection module in claim 1, wherein the bias element is selected from a test pull-up resistor and a current source.

3. The monitor detection module in claim 1, wherein the signal processing module further comprises:

a reference generator that generates at least one reference voltage;

a comparator, coupled to the pin for the analog video signal and the reference generator, the comparator comparing the voltage at the pin for the analog video signal with the at least one reference voltage to generate a comparison signal; and a control generation logic, coupled to the comparator, the control generation logic generates the at least one control signal from the comparison signal.

4. The monitor detection module in claim 1, wherein as a VGA display is coupled to the VGA connector via a VGA data cable and the VGA display is powered on, the bias element and the impedance at the pin for the analog video signal are coupled in series between the power supply and a ground potential during the monitor detection pulse.

5. The monitor detection module in claim 1, wherein when no VGA display is coupled to the computer, the pin for the analog video signal is pulled up to the power supply during the monitor detection pulse.

6. The monitor detection module in claim 1, wherein the at least one control signal is used to control the GPU to a hibernation state, reducing energy consumption.

7. A method of automatically detecting a VGA display in a computer, comprising the steps of:

identifying a monitor detection pulse that is synchronous with a sync pulse in a synchronization (sync) signal that is generated by a GPU in the computer;

coupling a bias element to a power supply, the bias element being coupled to drive a pin for an analog video signal included in a VGA connector;

decoupling the GPU from the pin for the analog video signal; and processing the output at the pin for the analog video signal to generate at least one control signal for the GPU and a central processing unit (CPU) in the computer.

8. The method in claim 7, wherein the bias element is selected from a test pull-up resistor and a current source.

9. The method in claim 7, the step of processing the output at the pin for the analog video signal further comprising steps of:

comparing the output at the pin for the analog video signal to a reference voltage;

generating the at least one control signal; and providing the at least one control signal to the GPU and the CPU.

10. The method in claim 7, wherein the analog video signal is selected from three analog video signals for red, green and blue colors, respectively, the sync signal is selected from a horizontal sync signal and a vertical sync signal.

11. The method in claim 7, wherein as the VGA display is coupled to the VGA connector via a VGA data cable and the VGA display is powered on, the bias element and the impedance at the pin for the analog video signal are coupled in series between the power supply and a ground potential ground during the monitor detection pulse.

12. The method in claim 7, wherein as no VGA display is connected to the computer, the pin for the analog video signal is pulled up to the power supply during the monitor detection pulse.

13. The method in claim 12, wherein the at least one control signal is used to control the GPU to a hibernation state, reducing energy consumption.

14. A system for automatically detecting a VGA display, comprising:

a first interface coupled to receive image information provided by a central processing unit (CPU);

a second interface coupled to a graphics processing unit (GPU) that receives and processes the image information to generate video signals according to a VGA display standard, the video signals comprising analog video signals and synchronization (sync) signals;

a third interface coupled to a VGA connector, the VGA connector further comprising a plurality of pins for receiving the video signals from the GPU; and a monitor detection module coupled between the VGA connector and the GPU, the monitor detection module receiving at least one analog video signal and at least one sync signal, identifying a monitor detection pulse, and monitoring the impedance of the pins during the monitor detection pulse.

15. The system in claim 14, wherein the GPU is in a hibernation state such that none of the sync signals includes sync pulses, the monitor detection pulse is generated periodically by the monitor detection module.

16. The system in claim 14, wherein the GPU is in a hibernation state such that none of the sync signals includes sync pulses, and monitor detection is performed continuously.

17. The system in claim 14, wherein at least one sync signal is selected from the sync signals to determine the monitor detection pulse during which the impedance of the pin for the at least one analog video signal is monitored.

18. The system in claim 14, wherein the VGA display is coupled to the third interface via a VGA data cable, and when the VGA display is powered on, a resistor divider is formed between a test pull-up resistor and the impedance at the pin for the at least one analog video signal during the monitor detection pulse, such that the impedance at the pin is monitored by the voltage at the pin for the at least one analog video signal to indicate the presence the VGA display.

19. The system in claim 14, wherein the VGA display is coupled to the third interface via a VGA data cable, and when the VGA display is powered on, a current source is coupled to drive the impedance at the pin for the at least one analog video signal during the monitor detection pulse, such that the impedance at the pin is monitored by the voltage at the pin for the at least one analog video signal to indicate the presence of the VGA display.

20. The system in claim 14, wherein no VGA display is coupled to the third interface, and the pin associated with the at least one analog video signal is pulled up to saturate at the voltage of a power supply during the monitor detection pulse.

* * * * *